United States Patent [19]
Pondo

[11] Patent Number: 6,017,649
[45] Date of Patent: Jan. 25, 2000

[54] MULTIPLE STEP FUEL CELL SEAL

[75] Inventor: Joseph M. Pondo, Bolingbrook, Ill.

[73] Assignee: M-C Power Corporation, Burr Ridge, Ill.

[21] Appl. No.: 09/022,741

[22] Filed: Feb. 12, 1998

[51] Int. Cl.[7] .................................................. H01M 2/08
[52] U.S. Cl. ................................................................ 429/35
[58] Field of Search ................................... 429/35, 36, 38, 429/39; 204/279

[56] References Cited

U.S. PATENT DOCUMENTS

| | | |
|---|---|---|
| 3,867,206 | 2/1975 | Trocciola et al. . |
| 4,178,216 | 12/1979 | Nordblom et al. . |
| 4,269,642 | 5/1981 | DeCasperis et al. . |
| 4,279,970 | 7/1981 | Breault et al. . |
| 4,365,008 | 12/1982 | DeCasperis et al. . |
| 4,450,212 | 5/1984 | Feigenbaum et al. . |
| 4,514,475 | 4/1985 | Mientek . |
| 4,604,331 | 8/1986 | Louis . |
| 4,609,595 | 9/1986 | Nickols . |
| 4,738,905 | 4/1988 | Collins . |
| 5,096,786 | 3/1992 | Granata, Jr. et al. . |
| 5,227,256 | 7/1993 | Marianowski et al. . |
| 5,232,792 | 8/1993 | Reznikov ............................. 429/35 X |
| 5,342,706 | 8/1994 | Marianowski et al. . |
| 5,362,578 | 11/1994 | Petri et al. ............................... 429/35 |
| 5,441,621 | 8/1995 | Molter et al. ....................... 204/279 X |
| 5,503,945 | 4/1996 | Petri et al. ............................... 429/35 |
| 5,811,202 | 9/1998 | Petraglia ................................. 429/35 |
| 5,906,898 | 5/1999 | Pondo ..................................... 429/34 |

*Primary Examiner*—Donald R. Valentine
*Attorney, Agent, or Firm*—Pauley Petersen Kinne & Fejer

[57] ABSTRACT

A separator plate for fuel cell stack comprising a multiple-step peripheral wet seal structure and a multiple-step manifold wet seal structure which utilizes lateral and vertical material displacement resulting from the application of cell clamping forces to provide improved fuel cell and stack reactant gas sealing.

10 Claims, 4 Drawing Sheets

MULTIPLE STEP FUEL CELL SEAL

BACKGROUND OF THE INVENTION

1. Field of the Invention

This invention relates to a multiple step fuel cell seal design which solves the problem of wet seal integrity of commercial size fuel cell stacks, both during the fuel cell conditioning phase and stack operation. The multiple step design reduces or completely eliminates matrix expulsion during fuel cell stack conditioning. The multiple step design of this invention is able to tolerate greater pressure differentials and increase fuel cell gas sealing efficiency during operation. The design is particularly applicable to internal manifolded molten carbonate fuel cell stack systems.

2. Description of Prior Art

Generally, fuel cell electrical output units are comprised of a stacked multiplicity of individual fuel cell units separated by inert or bi-polar electronically conductive separator plates. The separator plates provide the means for directing the reactant gases to the electrodes of the fuel cell units as well as support the cell's internal components. Individual cells are sandwiched together and secured into a single stage unit to achieve the desired fuel cell energy output. Each individual fuel cell unit generally includes an anode and cathode electrode, a common electrolyte, and a fuel and oxidant gas source. Both fuel and oxidant gases are introduced through manifolds to their respective reactant chambers between the separator plate and the electrolyte. The area of contact between the electrolyte and other cell components to maintain separation of the fuel and oxidant gases and prevent and/or minimize gas leakages is known as the wet seal. In addition to supporting the cells components, the wet seal area of the bi-polar separator plates must also provide a seal to prevent reactant gas leakage inside or to the outside of the fuel cell unit or stack. A major factor contributing to premature high temperature fuel cell failure is corrosion and fatigue in the wet seal area. This failure is hastened by corrosive electrolyte contact at high temperatures and high thermal stresses resulting from large temperature variations during thermal cycling of the cell, causing weakening of the structure through intracrystalline and transcrystalline cracking. Such failures permit undesired fuel and/or oxidant gas crossover and overboard gas leakage which interrupts the intended oxidation and reduction reactions of the fuel cell, thereby causing breakdown and eventual stoppage of cell current generation.

Commercially viable fuel cell stacks may contain up to about 600 individual fuel cell units, each having a planer area on the order of 3 to 12 square feet. In stacking such individual cells, separator plates separate the individual cells, with fuel and oxidant being introduced between a set of separator plates, the fuel being introduced between one face of the separator plate and the anode side of an electrolyte and oxidant being introduced between the other face of the separator plate and the cathode side of a second electrolyte. U.S. Pat. No. 5,342,706 to Marianowski et al. teaches a fully internal manifolded fuel cell stack which, upon assembly with electrolyte, has wet seals between the electrolyte and electrodes to provide ease of assembly and long term stability. However, during commercial size fuel cell stack testing of a fuel cell stack of the type disclosed by the '706 patent, we have observed cell matrix material being compressed and extruded outside of the cell areas. During electrolyte melting, under the clamping force applied to the cell stack, the matrix layers thin horizontally in the seal areas by the extrusion of the material laterally. The matrix material, because of the excess of electrolyte caused by the lack of porous electrodes in the wet seal area, becomes very soft and pliable, almost to a semi-plastic phase.

U.S. Pat. No. 3,867,206 to Trocciola et al. teaches a fuel cell having an electrolyte-saturated porous electrode and an electrolyte-saturated matrix between surfaces which are thereby wet by the electrolyte, the electrolyte providing a wet capillary seal against the escape of gas.

A manifold seal structure for fuel cell stacks comprising a mechanical interlock between the adhesive sealing strip and the abutting surface of the gas manifolds is taught by U.S. Pat. No. 4,738,905 to Collins. A phosphoric acid fuel cell having integral edge seals formed by an elastomer permeating an outer peripheral band contiguous with the outer peripheral edges of the cathode and anode assemblies and matrix to form an integral edge seal is taught by U.S. Pat. No. 5,096,786 to Granata, Jr. et al. And densified edge seals for fuel cell components and a method for forming densified edge seals are taught by U.S. Pat. No. 4,365,008 and U.S. Pat. No. 4,269,642, both to DeCasperis et al.

U.S. Pat. No. 4,514,475 to Mientek teaches a separator plate for separating adjacent fuel cells in a stack, which separator plate has two opposite side margins folded back over one side of the plate to form two first seal flanges and the other side margins folded back over the opposite side of the plate to form two second seal flanges. Each of the sealed flanges cooperates with the plate to define a channel in which is disposed a resiliently compressible stack of thin metal sheets.

U.S. Pat. No. 4,609,595 to Nickols teaches a fuel cell separator plate, the center portion of which is a generally rectangular, flat, electrical conductor. Around the periphery of the flat portion of the separator plate, a plurality of elongated resilient flanges are provided which form a gas-tight seal around the edges of the fuel cell. A fuel cell separator having a rectangular flat plate with two unitary upper sealing flanges respectively comprising opposite marginal edges of the plate folded upwardly and back on themselves and two lower sealing flanges respectively comprising the other two marginal edges of the plate folded downwardly and back on themselves is taught by U.S. Pat. No. 4,604,331 to Louis.

U.S. Pat. No. 4,279,970 to Breault et al. teaches a fuel cell comprising an electrolyte matrix layer disposed between and in contact with cooperating anode and cathode electrodes.

A seal for a gas distribution plate of a fuel cell having a groove extending along the edge of the distribution plate in which a resinous material is provided and a paste comprising an immobilized acid is provided surrounding the resinous material, thereby substantially filling the groove, is taught by U.S. Pat. No. 4,450,212 to Feigenbaum et al. The seal, thus formed, is said to be impervious to the gas being distributed throughout the fuel cell. An electrolyte-type seal formed by a bi-polar electrode support structure for a lead-acid battery having a porous matrix of valve metal impregnated with lead or a lead alloy and provided on at least one surface thereof with a rim-portion at which little or no lead is exposed is taught by U.S. Pat. No. 4,178,216 to Nordblom et al.

However, none of the prior art references of which we are aware completely solve the problem of wet seal integrity of commercial size fuel cell stacks both during the fuel cell conditioning phase (that is, start up) and fuel cell stack operation.

SUMMARY OF THE INVENTION

Accordingly, it is an object of this invention to provide a multiple step fuel cell seal for a fuel cell stack which solves the problem of wet seal integrity of commercial size fuel cell stacks, in particular, reducing or eliminating matrix expulsion, both during the fuel cell stack conditioning as well as stack operation.

It is another object of this invention to provide a multiple step fuel cell seal which is able to tolerate greater pressure differentials and increase the fuel cell's gas sealing efficiency during operation over conventional fuel cell stack systems employing single step wet seal designs.

These and other objects of this invention are achieved by a separator plate for a fuel cell stack, which fuel cell stack comprises a plurality of fuel cell units, each of which comprises an anode and a cathode, an electrolyte in contact on one side with an electrolyte facing face of the anode and in contact on the opposite side with an electrolyte facing face of the cathode. The separator plate separates the fuel cell units between the anode of one fuel cell unit and the cathode of an adjacent fuel cell unit, forming an anode chamber between the anode facing face of the separator plate and the anode and forming a cathode chamber between the opposite cathode facing face of the separator plate and the separator plate facing face of the cathode of said adjacent fuel cell unit, the anode chamber being in gas communication with a fuel gas supply and outlet and the cathode chamber being in gas communication with an oxidant gas supply and outlet.

The separator plate, the anode, and the cathode each form a plurality of aligned perforations, the perforations in the separator plate being surrounded by a primary flattened manifold wet seal structure extending from the faces of the separator plate to contact the electrolyte. The separator plate further comprises a multiple-step peripheral wet seal structure extending from each face completely around their peripheries, which multiple-step peripheral wet seal structure comprises a primary flattened peripheral wet seal structure, a retaining flattened wet seal structure adjacent to a portion of the primary flattened peripheral wet seal structure and a portion of the primary flattened manifold wet seal structure on a side of the primary flattened peripheral wet seal structure and the primary flattened manifold wet seal structure towards a center region of the separator plate, and the component shelf flattened peripheral wet seal structure adjacent to the retaining flattened wet seal structure on a side of the retaining flattened peripheral wet seal structure towards the center region of the separator plate. The retaining flattened wet seal structure extends from each face of the separator plate a distance less than the distance of the primary flattened peripheral wet seal structure; and the component shelf flattened wet seal structure extends from each face of the separator plate a distance less than the distance of the retaining flattened wet seal structure, thereby forming a first step between the retaining flattened wet seal structure and the primary flattened peripheral wet seal structure and a second step between the component shelf flattened wet seal structure and the retaining flattened wet seal structure.

In the fuel cell stack, the electrolyte and the separator plate extend to the edge of the fuel cell stack, the electrolyte being in contact with the primary flattened peripheral wet seal structure and the primary flattened manifold wet seal structure, thereby forming a peripheral wet seal and a manifold wet seal under cell operating conditions to form a plurality of gas manifolds extending through the fuel cell stack. Between the primary flattened peripheral wet seal structure and a portion of the primary flattened manifold wet seal structure facing away from the center region of the separator plate, the separator plate forms a channel. In this way, as the matrix material softens during conditioning of the fuel cell stack, it is constrained within the channel during compression of the fuel cell stack from the applied vertical cell clamping force.

Conduits extend through the primary flattened manifold wet seal structures between the gas manifolds and the center region of the separator plate, forming a fuel gas communication between one set of the gas manifolds and the center region of the separator plate on one face of the separator plate and forming an oxidant gas communication between another set of the gas manifolds and the center region of the separator plate on the other face of the separator plate.

BRIEF DESCRIPTION OF THE DRAWINGS

These and other features of this invention will be better understood from the following detailed description taken in conjunction with the drawings wherein.

DESCRIPTION OF PREFERRED EMBODIMENTS

The multiple step fuel cell seal of this invention provides a solution to the wet seal failures observed during fuel cell stack conditioning and operation of large commercial size stacks utilizing the conventional single step design as shown, for example, in U.S. Pat. No. 5,342,706. Wet seal failures have been particularly acute in fully internally manifolded molten carbonate fuel cells because of the high differential gas pressures the wet seals must withstand during operation. The multiple step design of this invention reduces or eliminates matrix expulsion during fuel cell stack conditioning and provides tolerance for greater pressure differentials and increases in the fuel cell's gas sealing efficiency during operation.

This invention is based upon a unique hardware design approach used in the construction of the seal area of a fuel cell's bi-polar metal separator plate. These bi-polar plates are used to separate individual fuel cells within a fuel cell stack configuration. A fuel cell stack is comprised of a great number of fuel cells separated by metal plates to provide reactant gas to the cell's electrodes and support the cell's internal components. The seal area of the bi-polar separator plates must support the cell's components and provide a wet electrolyte seal to prevent reactant gas leakage inside or to the outside of the cell or stack.

The cell design utilizes observations which have been made during commercial fuel cell stack testing of some matrix material being compressed and extruded outside of the seal areas. During electrolyte melting, under the clamp force applied to the cell stack, the matrix layers thin horizontally in the seal areas by the extrusion of material laterally. The matrix, because of the excess of electrolyte caused by the lack of porous electrodes in the wet seal area, becomes very soft and pliable almost to a semi-plastic phase.

Figure 1:
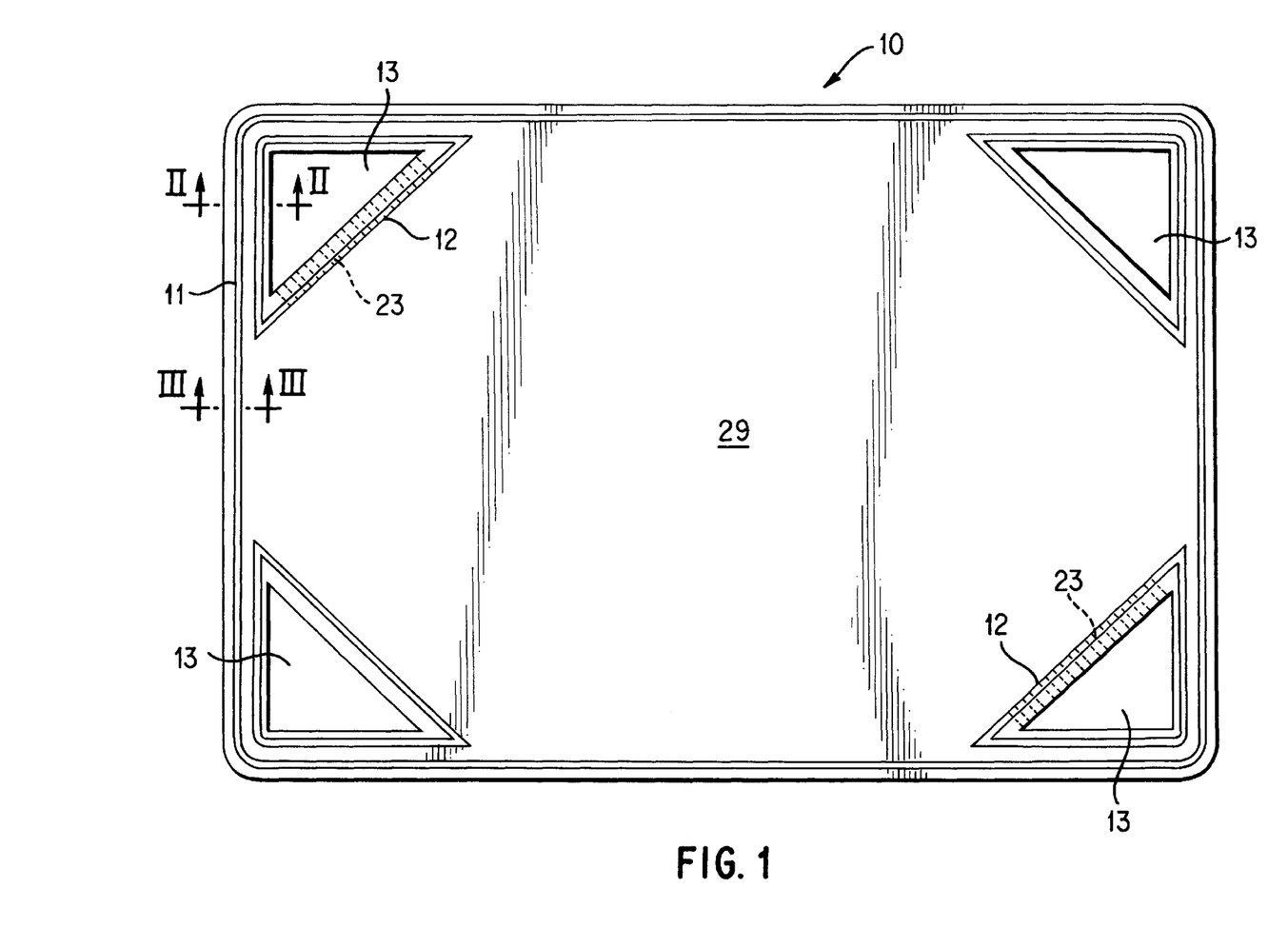
FIG. 1 is a plan view of a separator plate in accordance with one embodiment of this invention.

FIG. 1 shows a plan view of the wet seal structure of a fuel cell separator plate in accordance with one embodiment of this invention. Fuel cell separator plate 10 comprises peripheral wet seal structure 11 which extends from each face of separator plate 10 around the periphery of separator plate 10. Separator plate 10 further forms a plurality of perforations 13, each of which is surrounded by manifold wet seal structure 12 extending from each face of separator plate 10. Conduits 23 through manifold wet seal structure 12 provide for gas communication between perforations 13 and the center region 29 of separator plate 10, forming a fuel gas communication between one set of said aligned perforations on one face of separator plate 10 and forming an oxidant gas communication between another set of aligned perforations 13 on the other face of separator plate 10.

Figure 5:
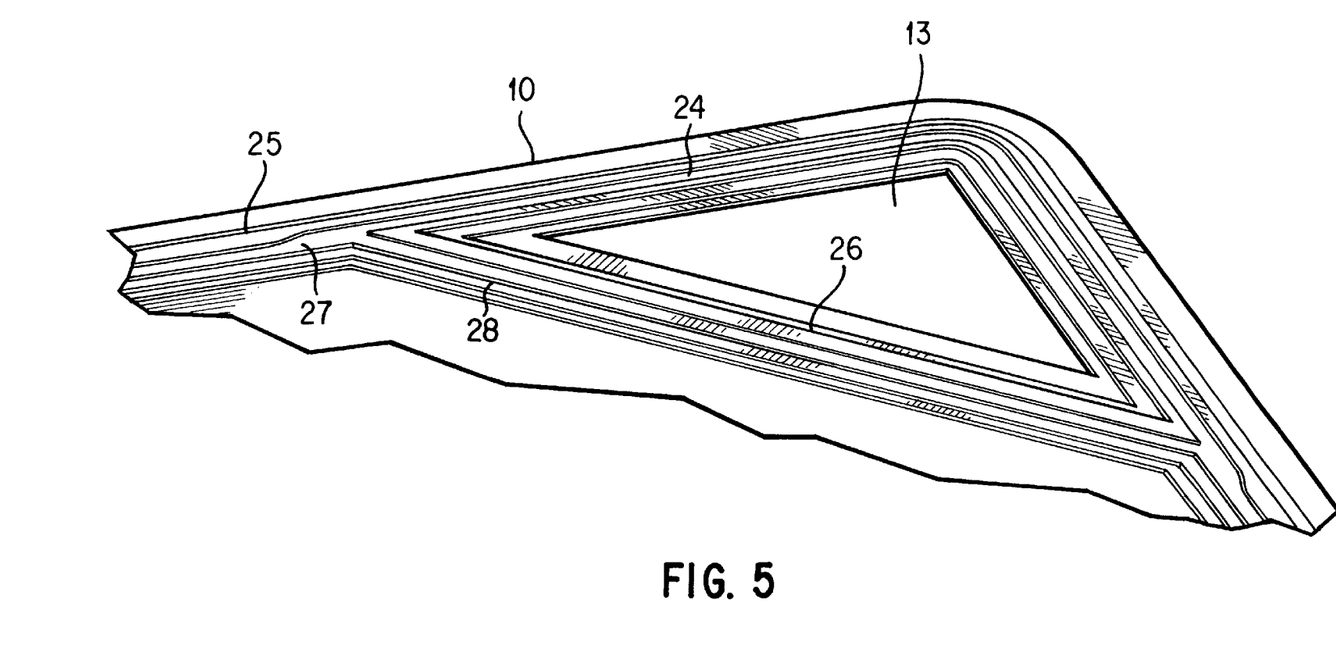
FIG. 5 is a partial perspective view of a separator plate for a fuel cell stack in accordance with one embodiment of this invention.

FIGS. 2A, 2B, 3A, 3B, and 5 show the multiple step seal design applied to an internally manifolded fuel cell in accordance with one embodiment of this invention. As shown in FIG. 5, separator plate 10 comprises a primary flattened peripheral wet seal structure 25 which extends from each face of separator plate 10 completely around their periphery. Perforation 13 is surrounded by primary flattened manifold wet seal structure 26 extending from each face of separator plate 10 completely around said perforations. Adjacent to a portion of primary flattened peripheral wet seal structure 25 on a side of primary flattened peripheral wet seal structure 25 towards center region 29 of separator plate 10, and adjacent a portion of primary flattened manifold wet seal structure 26 on a side of primary flattened manifold wet seal structure 26 facing center region 29 of separator plate 10 is retaining flattened wet seal structure 27 which completely surrounds center region 29 of separator plate 10. As can be seen, for example, in FIG. 3B, retaining flattened peripheral wet seal 27 extends from the face of separator plate 10 at a distance less than primary flattened peripheral wet seal 25 and primary flattened manifold wet seal 26, thereby forming a first raised step from retaining flattened peripheral wet seal 27 to primary flattened peripheral wet seal 25 and primary manifold wet seal 26.

Separator plate 10 further comprises component shelf flattened peripheral wet seal 28 adjacent to retaining flattened peripheral wet seal 27 on a side of retaining flattened peripheral wet seal 27 facing center region 29 of separator plate 10. As shown in FIGS. 3B and 5, component shelf flattened peripheral wet seal 28 extends from each face of separator plate 10 completely around center region 29 at a distance less than retaining flattened peripheral wet seal structure 27, thereby forming a second raised step from component shelf flattened peripheral wet seal structure 28 to retaining flattened peripheral wet seal structure 27.

Figure 2A:
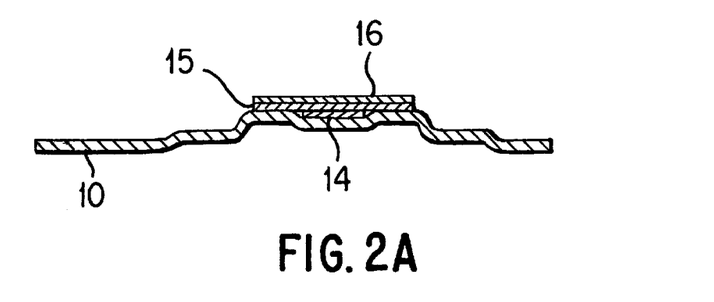
FIG. 2A is a cross-sectional view of a half cell unit in accordance with one embodiment of this invention taken along the line A—A as shown in FIG. 1.
Figure 2B:
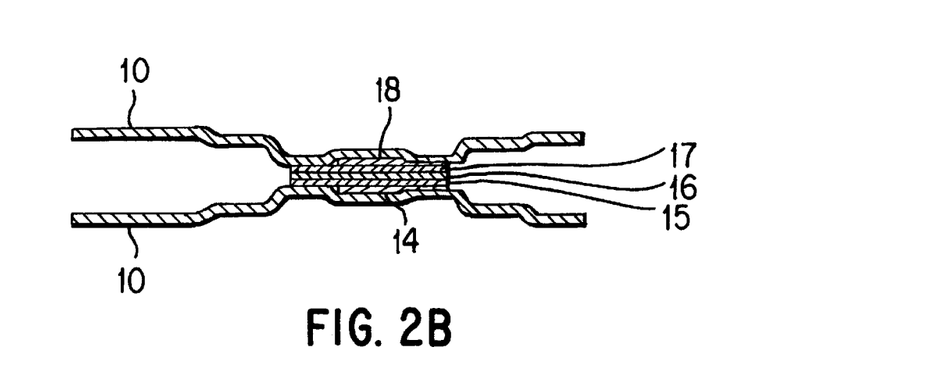
FIG. 2B is a cross-sectional view taken along the line A—A in FIG. 1 of a complete fuel cell unit in accordance with one embodiment of this invention.
Figure 3A:
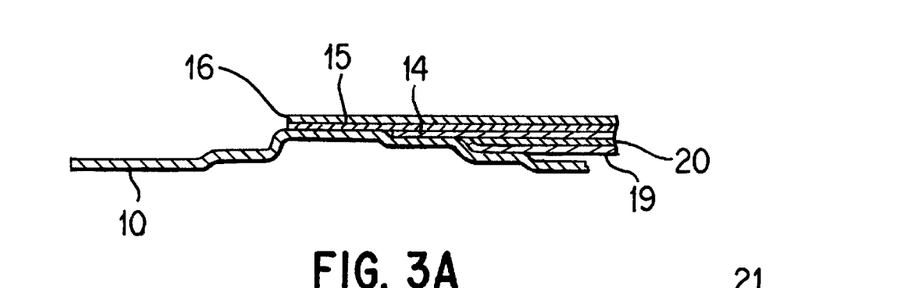
FIG. 3A is a cross-sectional view taken along line B—B of FIG. 1 of a half cell unit in accordance with one embodiment of this invention.
Figure 3B:
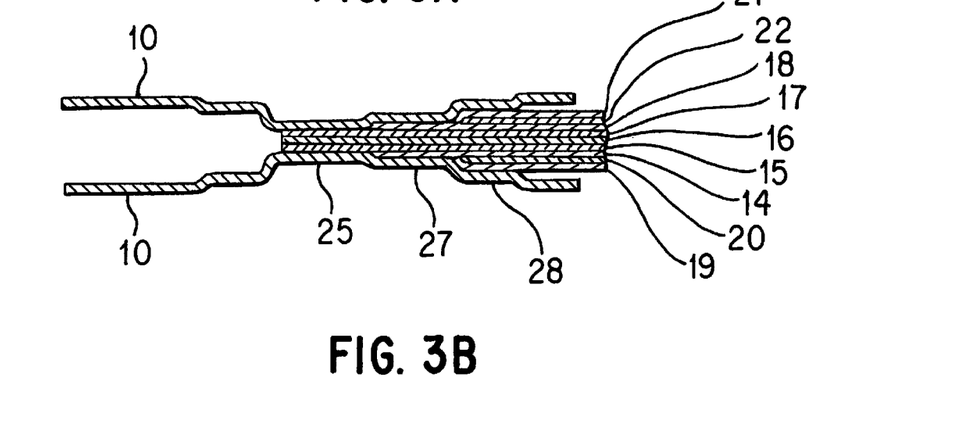
FIG. 3B is a cross-sectional view of a complete fuel cell unit taken along the line B—B in FIG. 1.
Figure 4:
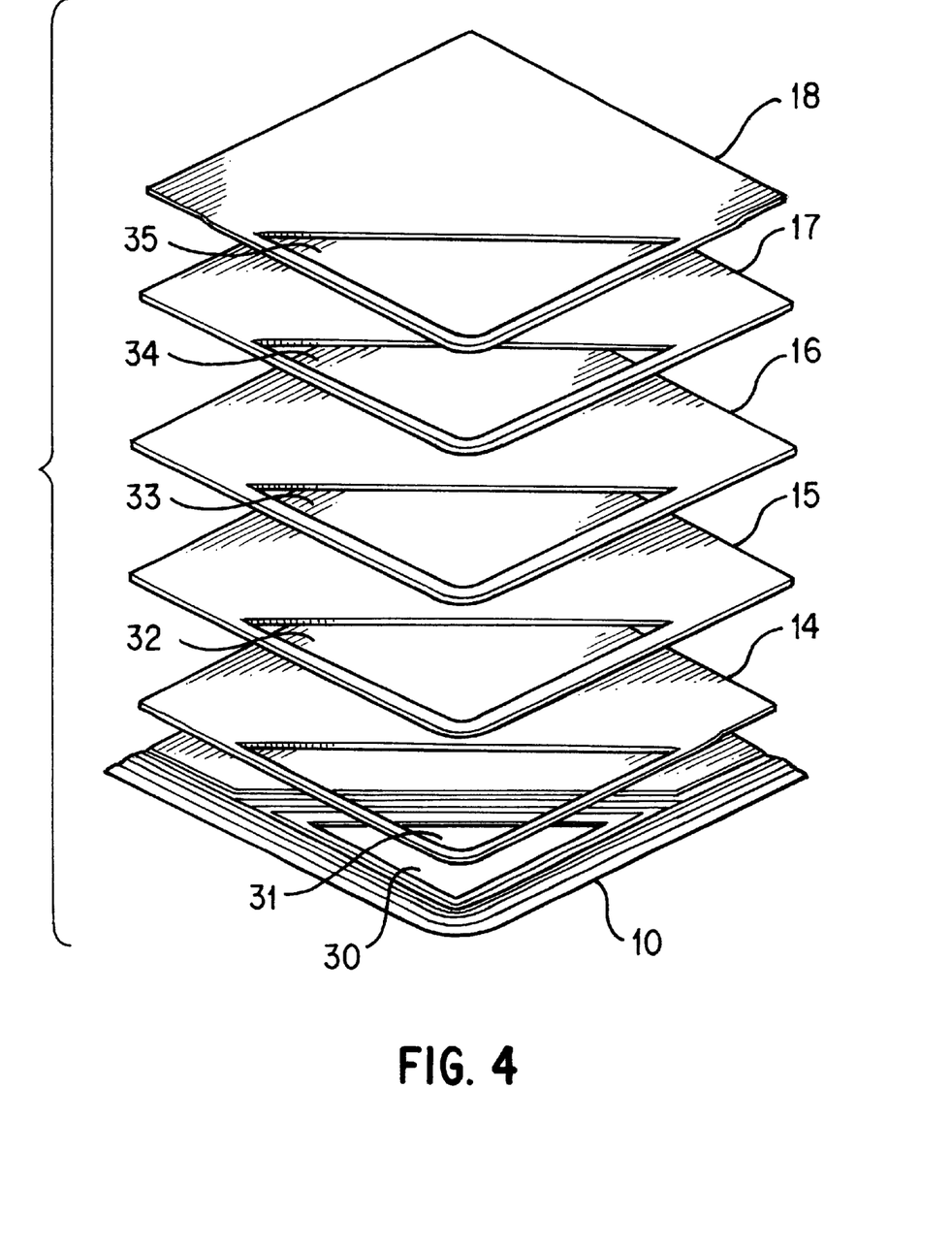
FIG. 4 is an exploded view of a portion of a fuel cell unit in accordance with one embodiment of this invention.

FIGS. 2A, 2B, 3A, and 3B show cross-sectional views of a fuel cell unit having a separator plate in accordance with one embodiment of this invention. FIGS. 2A and 2B are cross-sectional views taken along line A—A as shown in FIG. 1 and FIGS. 3A and 3B are cross-sectional views taken along line B—B as shown in FIG. 1. In the region of manifold wet seal structure 12 adjacent to primary flattened peripheral wet seal structure 11, separator plate 10 forms channel 24 as shown in FIG. 5. In the fuel cell's internal manifold structural areas, FIGS. 2A and 2B, first matrix layer 14 is positioned to face the anode side of separator plate 10 with its outer edges disposed inside channel 24. Second matrix layer 16 extends from primary flattened manifold wet seal 26 across channel 24 to the exterior of primary flattened peripheral wet seal 25. Disposed between first matrix layer 14 and second matrix layer 16 is first carbonate layer 15 which is coextensive with second matrix layer 16, extending across both primary flattened manifold wet seal 26 and primary flattened peripheral wet seal 25. Third matrix layer 18, FIG. 2B, is positioned to face the cathode side of an adjacent separator plate 10 having its outer edges disposed within channel 24 of said adjacent separator plate. Disposed between second matrix layer 16 and third matrix layer 18 is second carbonate layer 17 which is coextensive with second matrix layer 16. In this manner, channel 24 constrains the matrix material of first matrix layer 14 and third matrix layer 18 during compression from application of a cell clamping force. Channel 24 fills with the soft matrix material during stack conditioning and operation.

FIGS. 3A and 3B utilize the same sealing concept but modified by the absence of a channel. As shown in FIGS. 3A and 3B, first and third matrix layers 14 and 18 are positioned to face the separator plates 10 inside of retaining flattened wet seal 27. Unlike the manifold areas of separator plate 10, FIGS. 2A and 2B, there is no channel formed in the peripheral wet seal structure of separator plate 10. Rather, the step formed between retaining flattened wet seal structure 27 and primary flattened peripheral wet seal structure 25 constrains the movement of the matrix material on one side while the other side is constrained by the mass of the internal cell matrix material, the matrix material disposed toward the center region of separator plate 10. Component shelf flattened peripheral wet seal 28 which is in electrical contact with anode current collector 19 and anode 20 or cathode current collector 21 and cathode 22, which extends a distance from separator plate 10 less than the distance of retaining flattened wet seal 27, forming a step between component shelf flattened peripheral wet seal 28 and retaining flattened wet seal 27, provides an additional structure to prevent the expulsion of matrix material during partial electrolyte melt conditions experienced during the stack conditioning phase. This design, with proper selection of construction dimensions, and cell component thickness, offers superior reactant gas sealing of a fuel cell.

The interlocking design of the wet seal provides additional resistance to lateral cell movement, offering a more stable stack structure, thereby enabling construction of a stack containing a greater number of cells than conventional stacks. Adjustment of the thickness of matrix layer 16 allows the proper filling and sealing of channel 24, thereby maintaining a tight sealing of the fuel cell. The additional bends in separator plate 10 to form multiple wet seal surfaces, 24, 25, 26, 27, and 28 strengthen the seal structure. The additional strength enables the seal sheet metal (in the case of a stamped bi-polar plate) to retain its shape during processing, such as grit blasting, flame spraying, heat treating, and cell assembly.

When the cell components are stacked, the aligned perforations in separator plate 10, first matrix layer 14, first carbonate layer 15, second matrix layer 16, second carbonate layer 17, and third matrix layer 18 form internal gas manifolds for transport of reactant gases to and from the anode and cathode facing faces of separator plate 10.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A subassembly for a fuel cell unit comprising:

an anode, a cathode, and a separator plate disposed between said anode and said cathode;

said separator plate having a primary flattened peripheral wet seal structure extending from each face completely around their periphery;

said anode, said cathode, and said separator plate each having a plurality of aligned perforations, said perforations in said separator plate being surrounded by a primary flattened manifold wet seal structure extending from each said face of said separator plate completely around said perforations;

said separator plate having a retaining flattened wet seal structure adjacent a portion of said primary flattened peripheral wet seal structure on a side of said primary flattened peripheral wet seal structure towards a center region of said separator plate and adjacent a portion of said primary flattened manifold wet seal structure of each said perforation on a side of said primary flattened manifold wet seal structure facing said center region of said separator plate, said retaining flattened peripheral wet seal extending from each said face completely around said center region of said separator plate at a distance less than said primary flattened peripheral wet seal structure and said primary manifold wet seal structure, thereby forming a first raised step from said retaining flattened peripheral wet seal structure to said primary flattened peripheral wet seal structure and said primary manifold wet seal structure;

said separator plate having a component shelf flattened peripheral wet seal structure adjacent said retaining flattened peripheral wet seal structure on a side of said retaining flattened peripheral wet seal structure towards said center region of said separator plate, said component shelf flattened peripheral wet seal extending from each said face completely around said center region at a distance less than said retaining flattened peripheral wet seal structure, thereby forming a second raised step from said component shelf flattened peripheral wet seal structure to said retaining flattened peripheral wet seal structure;

said anode in electrical contact with said component shelf peripheral wet seal on one said face of said separator plate and said cathode in electrical contact with said component shelf peripheral wet seal on the other face of said separator plate;

said separator plate forming a channel between said primary flattened peripheral wet seal structure and a portion of said primary flattened manifold wet seal structure facing away from said center region of said separator plate; and conduits extending through said primary flattened manifold wet seal structures between said aligned perforations and said center regions of said separator plate, forming a fuel gas communication between one set of said aligned perforations and said center region of said separator plate on one said face of said separator plate and forming an oxidant gas communication between another set of said aligned perforations and said center region of said separator plate on said other face of said separator plate.

2. A subassembly for a fuel cell unit in accordance with claim 1, wherein an anode current collector is disposed between said anode and said one face of said separator plate, said anode current collector in electrical contact with said component shelf flattened peripheral wet seal on said one face of said separator plate, and a cathode current collector is disposed between said cathode and said other face of said separator plate, said cathode current collector in electrical contact with said component shelf flattened peripheral wet seal on said other face of said separator plate.

3. In a fuel cell stack comprising a plurality of fuel cell units, each said fuel cell unit comprising an anode and a cathode, an electrolyte in contact on one side with an electrolyte facing face of said anode and in contact on an opposite side with an electrolyte facing face of said cathode, and a separator plate separating said fuel cell units between an anode and cathode forming an anode chamber between the anode facing face of said separator plate and said anode and forming a cathode chamber between the opposite cathode facing face of said separator plate and the separator plate facing face of said cathode of an adjacent said fuel cell unit, said anode chamber in gas communication with a fuel gas supply and outlet and said cathode chamber in gas communication with an oxidant gas supply and outlet, the improvement comprising:

said separator plate, said anode and said cathode each having a plurality of aligned perforation, said perforations in said separator plate being surrounded by a primary flattened manifold wet seal structure;

said separator plate having a multiple-step peripheral wet seal structure extending from each face completely around their periphery, said multiple-step peripheral wet seal structure comprising a primary flattened peripheral wet seal structure, a retaining flattened wet seal structure adjacent a portion of said primary flattened peripheral wet seal structure and a portion of said primary flattened manifold wet seal structure on a side of said primary flattened peripheral wet seal structure and said primary flattened manifold wet seal structure towards a center region of said separator plate, and a component shelf flattened peripheral wet seal structure adjacent said retaining flattened wet seal structure on a side of said retaining flattened peripheral wet seal structure towards said center region of said separator plate, said retaining flattened wet seal structure extending from each said face a distance less than the distance of said primary flattened peripheral wet seal structure and said component shelf flattened peripheral wet seal structure extending from each said face a distance less than the distance of said retaining flattened peripheral wet seal structure;

said electrolyte and said separator plate extending to the edge of said fuel cell stack, said electrolyte in contact with said primary flattened peripheral wet seal structure and said primary flattened manifold wet seal structure, forming a peripheral wet seal and a manifold wet seal under cell operating conditions to form a plurality of gas manifolds extending through said fuel cell stack;

said separator plate forming a channel between said primary flattened peripheral wet seal structure and a portion of said primary flattened manifold wet seal structure facing away from said center region of said separator plate; and conduits extending through said primary flattened manifold wet seal structures between said gas manifolds and said center region of said separator plate, forming a fuel gas communication between one set of said gas manifolds and said center region of said separator plate on one said face of said separator plate and forming an oxidant gas communication between another said of said gas manifolds and said center region of said separator plate on said other face of said separator plate.

4. A fuel cell stack in accordance with claim 3, wherein fuel cell stack end plates are configured the same as said separator plates on their inner faces and warm half cells on each end of said fuel cell stack.

5. A fuel cell stack in accordance with claim 3, wherein said separator plates comprise an electronically conducting material and are about 0.005 to about 0.050 inches thick.

6. A fuel cell stack in accordance with claim 5, wherein said primary flattened peripheral wet seal structure on one face of said separator plates comprises a pressed shaping of said separator plates to form said extended peripheral wet seal on said one face of said separator plates and on the other face of said separator plates comprises a pressed shape forming said extended peripheral wet seal fastened to said other face of said separator plates.

7. A fuel cell stack in accordance with claim 6, wherein said primary flattened manifold wet seal structure on one face of said separator plates comprises a pressed shaping of said separator plates to warm said extended manifold wet seal on said one face of said separator plates and on the other face of said separator plates comprises a pressed shape forming said extended peripheral wet seal fastened to said other face of said separator plates.

8. A fuel cell stack in accordance with claim 3, wherein said primary flattened peripheral wet seal structure on one face of said separator plates comprises a pressed shaping of said separator plates to form said extended peripheral wet seal on said one face of said separator plates and on the other face of said separator plates comprises a pressed shape forming said extended peripheral wet seal fastened to said other face of said separator plates.

9. A fuel cell stack in accordance with claim 3, wherein said primary flattened manifold wet seal structure on one face of said separator plates comprises a pressed shaping of said separator plates to warm said extended manifold wet seal on said one face of said separator plates and on the other face of said separator plates comprises a pressed shape forming said extended peripheral wet seal fastened to said other face of said separator plates.

10. A fuel cell stack in accordance with claim 3, wherein said primary flattened peripheral wet seal structure, said retaining flat peripheral wet seal structure, said component shelf flattened peripheral wet seal structure, and said primary flattened manifold wet seal structure have a width in a range of about 0.25 to about 0.75 inches.

* * * * *

UNITED STATES PATENT AND TRADEMARK OFFICE
CERTIFICATE OF CORRECTION

PATENT NO : 6,017,649
DATED : 25 January 2000
INVENTOR(S) : Joseph M. PONDO

It is certified that error appears in the above-identified patent and that said Letters Patent is hereby corrected as shown below:

In column 4, line 22, delete "A-A" and insert --II-II-- in its place.

In column 4, line 24, delete "A-A" and insert --II-II-- in its place.

In column 4, line 26, delete "B-B" and insert --III-III-- in its place.

In column 4, line 30, delete "B-B" and insert --III-III-- in its place.

In column 5, line 60, delete "A-A" and insert --II-II-- in its place.

In column 5, line 62, delete "B-B" and insert --III-III-- in its place.

Signed and Sealed this

Sixth Day of February, 2001

Attest:

Q. TODD DICKINSON

*Attesting Officer*   *Director of Patents and Trademarks*